United States Patent
Mori et al.

(10) Patent No.: US 6,586,907 B1
(45) Date of Patent: Jul. 1, 2003

(54) CELL TUBE AND METHOD OF MANUFACTURING THE CELL TUBE

(75) Inventors: Katsuhiko Mori, Katano (JP); Tomomichi Ueda, Osaka (JP); Shoji Yamashita, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/258,835
(22) PCT Filed: May 1, 2001
(86) PCT No.: PCT/JP01/03801
§ 371 (c)(1),
(2), (4) Date: Oct. 28, 2002
(87) PCT Pub. No.: WO01/84647
PCT Pub. Date: Nov. 8, 2001

(30) Foreign Application Priority Data

Apr. 28, 2000 (JP) ......................................... 2000-131126

(51) Int. Cl.⁷ ............................. H02J 7/00; H01M 2/04; H01M 6/00
(52) U.S. Cl. ..................... 320/107; 429/176; 29/623.1
(58) Field of Search ................................. 320/107, 110; 429/176, 163; 29/623.1, 730

(56) References Cited

U.S. PATENT DOCUMENTS 6,258,480 B1 * 7/2001 Moriwaki et al. ......... 29/623.1
6,261,718 B1 * 7/2001 Ohmura et al. ............. 429/176

* cited by examiner

Primary Examiner—Edward H. Tso
Assistant Examiner—Pia Tibbits
(74) Attorney, Agent, or Firm—Jordan and Hamburg LLP

(57) ABSTRACT

A battery case (1) is formed such that a thickness ($t_1$) of a side wall (1a) with respect to a thickness ($t_0$) of a bottom wall (1b) satisfies $t_1 = \alpha t_0$ ($\alpha = 0.2$ to $0.7$) undergoing an ironing step using ironing dies (11, 12, and 13) aligned in multiple stages, and that an inside face of the side wall is made to have a rough surface having average surface roughness of 0.2 $\mu$m to 2.0 $\mu$m by undergoing a drawing step after the ironing step. A manufacturing method of the battery case includes a first step of manufacturing a battery case element (7) by applying the DI processing to a cup-shaped intermediate product (4), and a second step of manufacturing a battery case by reducing an outside diameter to a predetermined outside diameter (r) without changing a thickness of a side wall by applying drawing processing to the battery case element by drawing dies (18 and 19) aligned in multiple stages.

2 Claims, 9 Drawing Sheets

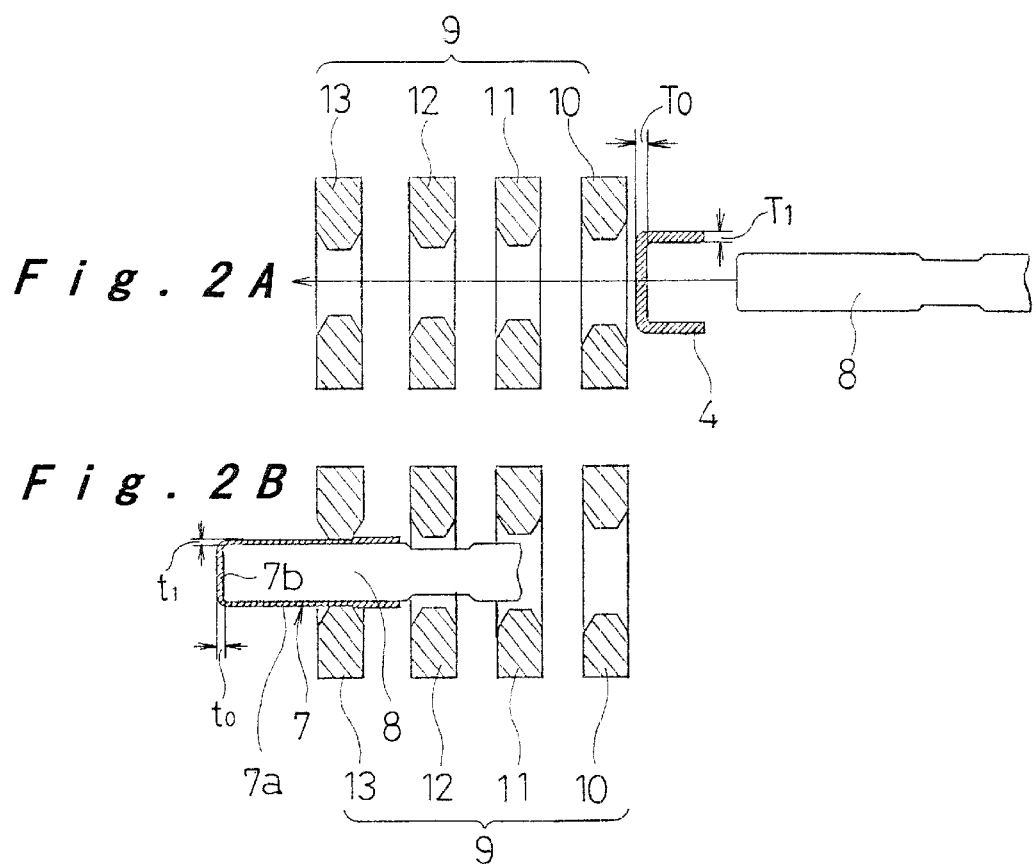

CELL TUBE AND METHOD OF MANUFACTURING THE CELL TUBE

TECHNICAL FIELD

The present invention relates to a battery case used as an exterior case for various kinds of batteries, such as an alkaline dry battery, a nickel-cadmium rechargeable battery, and a lithium rechargeable battery, and to a method of manufacturing such a battery case with DI (drawing processing and ironing processing) processing.

BACKGROUND ART

Conventionally, a method for manufacturing a battery case chiefly adopts the transfer drawing method for manufacturing a battery case of a predetermined shape by repeating deep-drawing processing and punching processing for 10 to 13 steps by a transfer press machine, and the DI processing method for manufacturing a cup-shaped intermediate product in a deep-drawing step by a press machine first and thence manufacturing a battery case of a predetermined shape from the cup-shaped intermediate product in a drawing step using a drawing die and in an ironing step using an ironing die. The DI processing method is advantageous over the transfer drawing method in that the productivity can be enhanced by reducing the number of steps, and because only the side wall is stretched to reduce the thickness thereof during the step of applying the ironing processing to the cup-shaped intermediate product, a larger capacity can be achieved, which makes it possible to enhance the battery characteristics with an increasing capacity resulted from an increased filling agent while reducing the weight, and therefore, the utilization factor thereof has been rising.

The battery case manufactured by the DI processing method has many advantages as described above; however, on the other hand, the inside face of the side wall of the battery case is pressed hard against the body portion of the punch during the ironing processing, and the inner surface of the side wall is undesirably made smooth. As a result, there arises a problem that a contact area between the inside face of the side wall and an active material or a cathode mix accommodated in the battery case is diminished and an internal resistance of the battery increases, which results in deterioration of the battery characteristics. In particular, an alkaline dry battery establishes electrical conduction at the positive electrode side only by a secondary contact between the inside face of the side wall of the battery case serving also as the positive electrode and a pellet of the cathode mix, and for this reason, an increased internal resistance of the battery caused by the aforementioned diminished contact area lowers the battery performance drastically, and among others, the high load discharge characteristics for drawing a large current are deteriorated.

Accordingly, an internal resistance of the battery between the inside face of the side wall and the cathode mix or the active material is reduced conventionally by applying a conductive coating material, such as carbon, or a conductive agent onto the inside face of the side wall of the battery case, or by forming a nickel-tin plated alloy layer on the inside face of the side wall. Theses means, however, cannot reduce the internal resistance of the battery sufficiently; moreover, because the surface on the inside face of the side wall is smooth, the retentivity for the conductive coating material or the conductive agent is too weak to achieve required post-preservation battery characteristics.

On the other hand, a battery case manufactured by a processing method other than the above-described DI processing method, for example, the above-described transfer drawing method, has the surface on the inside face of the side wall made rough with minute wrinkles made while the drawing step is repeated a large number of times. Hence, a contact area with the cathode mix or the active material is enlarged, which makes it possible to suppress an increase in internal resistance of the battery. However, the ironing processing is seldom applied in the transfer drawing method, and in that event, the thickness of the side wall is hardly reduced in comparison with the thickness of the bottom wall. Hence, the capacity of the battery case remains the same, and there is a drawback that a filling amount of the active material or the like is reduced, and the charge and discharge characteristics are deteriorated. In addition, because this manufacturing method of the battery case has too many steps as described above, the productivity cannot be enhanced, which results in an increase of the manufacturing costs.

In light of the conventional problems as described above, the present invention has an object to provide a battery case having a shape that enlarges a contact area between the inside face of the side wall and the cathode mix or the active material while keeping a large capacity, and a method for manufacturing such a battery case at high productivity.

DISCLOSURE OF THE INVENTION

In order to achieve the above objects, a battery case of the present invention is formed in such a manner that: a thickness $t_1$ of a side wall with respect to a thickness $t_0$ of a bottom wall satisfies $t_1 = \alpha t_0$ ($\alpha = 0.2$ to $0.7$) by undergoing an ironing step using ironing dies aligned in multiple stages; and an inside face of the side wall has a rough surface having average surface roughness of $0.2 \,\mu m$ to $2.0 \,\mu m$ by undergoing a drawing step after the ironing step.

This battery case has a large contact area between the inside face of the side wall and the cathode mix or the active material accommodated therein, whereby an internal resistance of the battery is reduced drastically. Also, when a conductive material, such as carbon, is applied onto the inside face of the side wall, the retentivity for the conductive material or the like is enhanced, which makes it possible to maintain high post-preservation battery characteristics over a long period. In order to enlarge the contact area, the average surface roughness is set to a range from $0.2 \,\mu m$ to $2.0 \,\mu m$. Also, this battery case has a large capacity, because the side wall is made thinner than the bottom wall by undergoing the ironing step. Hence, a filling quantity of the cathode mix or the active material is increased, and the battery performance, such as charge and discharge characteristics, is enhanced.

A manufacturing method of a battery case of the present invention includes: a first step of manufacturing a battery case element by applying drawing processing by at least one drawing die and ironing processing by ironing dies aligned in multiple stages to a cup-shaped intermediate product, so that a thickness $t_1$ of a side wall with respect to a thickness $t_0$ of a bottom wall satisfies $t_1 = \alpha t_0$ ($\alpha = 0.2$ to $0.7$); and a second step of manufacturing a battery case by reducing an outside diameter of the battery case element to a predetermined outside diameter without changing the thickness of the side wall by applying drawing processing with drawing dies aligned in multiple stages.

According to this manufacturing method of the battery case, ironing processing is not applied in the second step.

Hence, the battery case element is plastically deformed to a condition that the outside diameter is reduced to a predetermined outside diameter while maintaining the thickness of the side wall. Accordingly, the inside face of the side wall of the battery case is made rough with minute wrinkles made while the outside diameter is reduced without changing the thickness of the side wall. Consequently, fine irregularities are formed across the inside face at a uniform density, which enlarges a contact area with the cathode mix or the active material. The inner surface of the side wall is made rough by undergoing a series of manufacturing procedures of the battery case without requiring any special step. Hence, the productivity is not impaired.

Also, because the ironing processing is applied to the cup-shaped intermediate product in the first step, the side wall is made thinner than the bottom wall, and the outside diameter is reduced without changing the thickness of the side wall in the second step. Hence, the completed battery case has a large capacity. Further, in the second step, a material corresponding to deformation caused by the diameter reduction of the battery case element is flown so that it is released into the bottom wall. Hence, a step portion is formed at the peripheral portion of the bottom wall thicker than the side wall. As a result, the completed battery case has the strength high enough to prevent an occurrence of buckling or the like.

BRIEF DESCRIPTION OF THE DRAWINGS

FIGS. 2A and 2B are cross sections schematically showing a sequence of manufacturing procedures in a first step to embody a method for manufacturing the above battery case according to a first embodiment of the invention;

BEST MODE FOR CARRYING OUT THE INVENTION

Figure 1A:
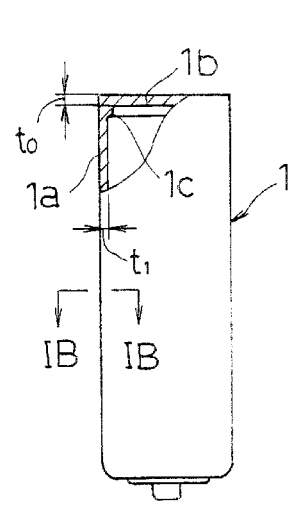
FIG. 1A is a partially broken side view showing a battery case according to one embodiment of the present invention.
Figure 1B:
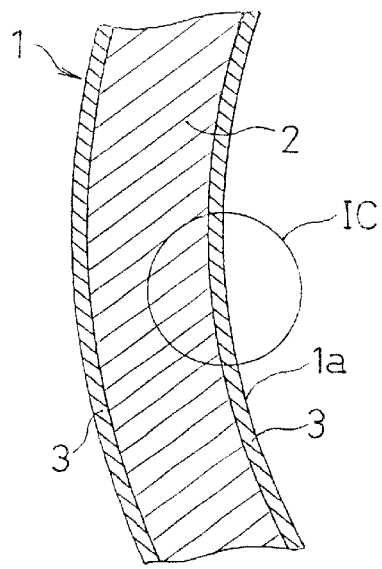
FIG. 1B is an enlarged cross section taken along the line IB—IB of FIG. 1A.
Figure 1C:
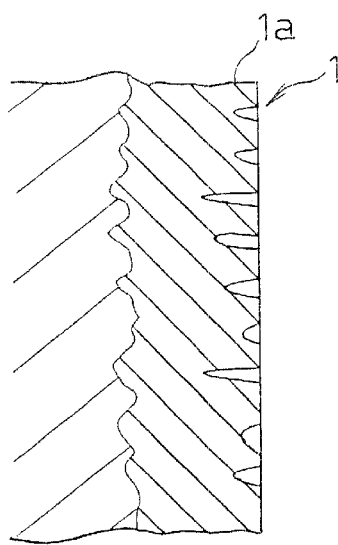
FIG. 1C is an enlarged view schematically showing a portion IC of FIG. 1B.

The following will describe preferred embodiments of the present invention with reference to the drawings. FIG. 1A is a partially broken side view showing a battery case 1 according to one embodiment of the present invention. FIG. 1B is an enlarged cross section taken along the line IB—IB of FIG. 1A. FIG. 1C is an enlarged view schematically showing a portion IC of FIG. 1B. As shown in FIG. 1A, the battery case 1 is manufactured such that the thickness $t_1$ of the side wall 1$a$ with respect to the thickness $t_0$ of the bottom wall 1$b$ satisfies $t_1=\alpha t_0$ ($\alpha=0.2$ to 0.7). The capacity of the battery case 1 increases as the thickness $t_1$ of the side wall 1$a$ is reduced. Hence, this battery case 1 has satisfactory pressure withstand strength because of the presence of the relatively thick bottom wall 1$b$ and a step portion 1$c$ at the bottom peripheral portion defined as a boundary between the bottom wall 1$b$ and the side wall 1$a$ while having a larger battery capacity by increasing a filling quantity of the active material or the cathode mix.

Also, as shown in FIG. 1B, the battery case 1 is manufactured by using a nickel-plated steel plate including a steel plate 2 and a nickel-plating layer 3 formed thereon as a material. The reason why the nickel-plated steel plate is used is as follows: nickel has good resistance to alkali corrosion by strongly alkaline potassium hydroxide used as an electrolyte in an alkaline dry battery and a nickel-cadmium rechargeable battery, to which the battery case 1 is mainly applied; nickel shows a stable contact resistance when the battery is connected to an external terminal; nickel shows an excellent spot welding property for spot welding applied when the battery is assembled, etc.

Figure 1D:
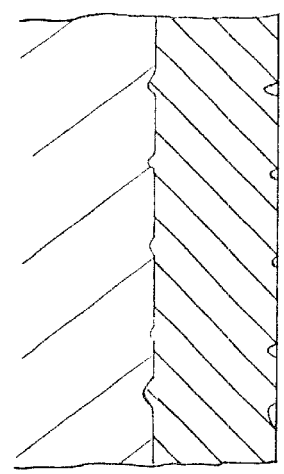
FIG. 1D is an enlarged cross section schematically showing a conventional battery case for comparison with FIG. 1C.

Further, as shown in FIG. 1C, many irregularities are formed across the inside face of the side wall 1$a$ of the battery case 1 at a uniform density and fine intervals, and the average surface roughness Ra is set to 0.2 $\mu$m to 2.0 $\mu$m. FIG. 1D is a view schematically showing the roughness of the inside face of the side wall of a conventional battery case manufactured by the DI processing method for comparison with FIG. 1C. The inside face of the side wall 1$a$ of the battery case 1 of the present embodiment has a rough surface on which relatively large irregularities are formed at fine intervals in comparison with the conventional battery case. Consequently, a larger contact area is secured with the cathode mix or the active material accommodated in the battery case 1, which drastically reduces an internal resistance of the battery. Also, when a conductive material, such as carbon, is applied onto the inside face of the side wall 1$a$, the retentivity for the conductive material or the like is enhanced, which improves the post-preservation battery characteristics.

Next, the following will describe a method for manufacturing the battery case 1 of the above-described embodiment at high productivity and with high accuracy.

Figure 3A:
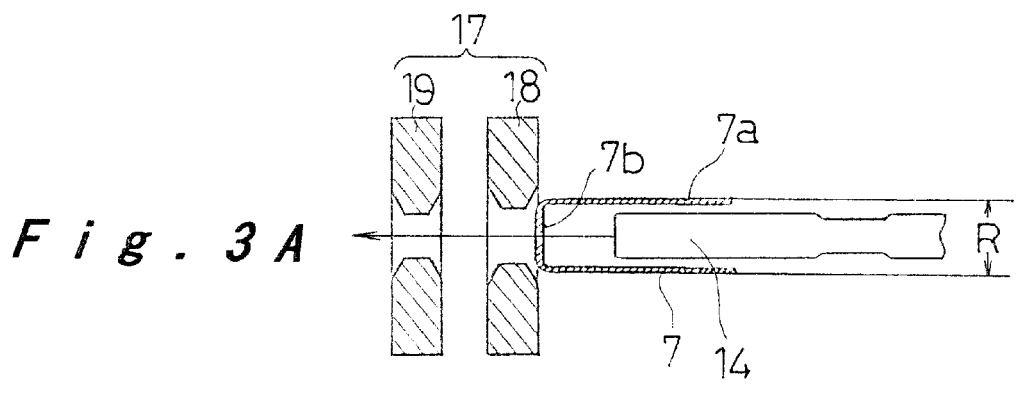
FIGS. 3A and 3B are cross sections schematically showing a sequence of manufacturing procedures in a second step of the above manufacturing method.
Figure 3B:
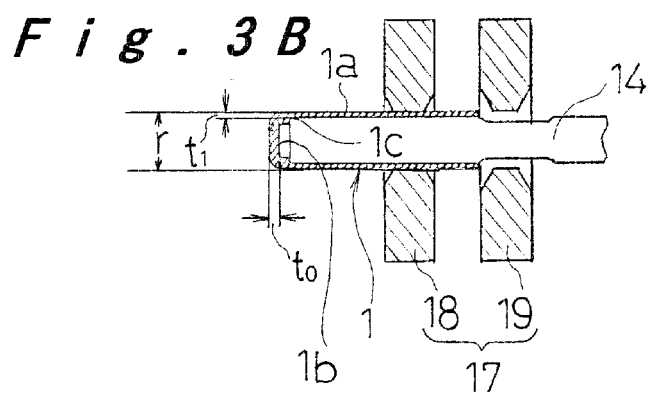

Firstly, the manufacturing method of the battery case 1 according to a first embodiment of the invention has a first step shown in FIGS. 2A and 2B, and a second step shown in FIGS. 3A and 3B. The first step shown in FIGS. 2A and 2B adopts the DI processing method using a known drawing and ironing machine. The drawing and ironing machine applies single-stage drawing processing and triple-stage ironing processing at a time to a cup-shaped intermediate product 4 manufactured in and transported from the step prior to the first step, whereby a battery case element 7 shown in FIG. 2B is manufactured. Because the cup-shaped intermediate product 4 undergoes known steps, an illustration of these steps is omitted herein. However, it is manufactured by punching out a hoop-shaped battery case material supplied to a press machine into a predetermined shape, and then by applying deep-drawing processing. The thickness $T_1$ of the side wall of the cup-shaped intermediate product 4 is substantially the same as the thickness $T_0$ of the bottom wall.

The drawing and ironing machine used in the first step includes a first punch 8, a dies mechanism 9, and a stripper (not shown). The dies mechanism 9 includes a drawing die 10 and first through third ironing dies 11 through 13, all of which are aligned in series concentrically with the axis of the first punch 8. The cup-shaped intermediate product 4 transported by an intermediate product transportation unit (not shown) is positioned at a molding position shown in FIG. 2A, and is pushed to move by the first punch 8 that moves ahead in a direction indicated by an arrow from the molding position, whereby the shape thereof is drawn into a shape conforming to the tip end shape of the first punch 8 by the drawing die 10 in the first place. As a result of this drawing processing, the cup-shaped intermediate product 4 is plastically deformed to have a slightly smaller diameter and become taller, but the thickness thereof is hardly changed.

The cup-shaped intermediate product 4 is pushed to move further by the first punch 8, and the ironing processing in the first stage is applied by the first ironing die 11, whereby the side wall 1a is stretched and the thickness is reduced and the hardness is increased by work hardening. When the cup-shaped intermediate product 4 is pushed to move furthermore by the first punch 8, the ironing processing in the second stage is applied by the second ironing die 12 having a smaller inside diameter than the first ironing die 11, and subsequently, the ironing processing in the third stage is applied by the third ironing die 13 having a smaller inside diameter than the second ironing die 12. As a result, as shown in FIG. 2B, the side wall 1a is stretched step by step, so that the thickness is reduced further and the hardness is increased. The battery case element 7 manufactured by having undergone the drawing processing and the ironing processing by the DI processing method is removed from the drawing and ironing machine by the stripper. In this battery case element 7, the thickness $t_1$ of the side wall 7a with respect to the thickness $t_0$ of the bottom wall 7b satisfies $t_1 = \alpha t_0$ ($\alpha = 0.2$ to $0.7$).

In the subsequent second step, the drawing processing is applied to the battery case element 7 manufactured in the first step by a drawing press machine as shown in FIGS. 3A and 3B. The drawing press machine applies double-stage drawing processing to the battery case element 7 manufactured in and transported from the first step, whereby the required battery case 1 shown in FIG. 3B is manufactured. The drawing press machine used in the second step includes a second punch 14, a dies mechanism 17, and a stripper (not shown). The dies mechanism 17 includes a first drawing die 18 and a second drawing die 19, which are aligned in series concentrically with the axis of the second punch 14.

The battery case element 7 transported by a battery case element transportation unit (not shown) is positioned at a molding position shown in FIG. 3A, and is pushed to move by the second punch 14 as it moves ahead in a direction indicated by an arrow in the drawing, whereby the shape thereof is drawn into a shape conforming to the tip end shape of the second punch 14 by the first drawing die 18. As a result of this drawing processing, the battery case element 7 is plastically deformed to have a slightly smaller diameter and become taller with the thickness of the side wall 7a being hardly changed.

The battery case element 7 is pushed to move further by the second punch 14, and is drawn into the same condition as described above by the second drawing die 19 having a smaller inside diameter than the first drawing die 18. As a result, as shown in FIG. 3B, the required battery case 1 is completed. The battery case 1 thus manufactured is removed from the drawing press machine by the stripper.

According to the battery case 1 manufactured in this manner, only the drawing processing is applied in the second step to the battery case element 7 manufactured by the DI processing method in the first step, and no ironing processing is applied. Hence, the battery case element 7 is plastically deformed in a condition that the outside diameter R is reduced to a predetermined smaller outside diameter r while maintaining the thickness $t_1$ of the side wall 7a. It should be noted, however, that in the second step, a material corresponding to deformation caused by the diameter reduction of the battery case element 7 is flown so that it is released into the bottom wall 1b. Hence, the bottom wall thickness to is hardly changed, but a step portion 1c is formed at the peripheral portion of the bottom wall 1b.

According to the manufacturing method of the battery case 1, the outside diameter R of the battery case element 7 is reduced to the predetermined smaller outside diameter r without changing the thickness $t_1$ of the side wall 7a in the second step. This naturally provides the inside face of the side wall 7a with a rough surface, thereby making it possible to manufacture the battery case 1 of the embodiment shown in FIG. 1A with high accuracy. Herein, the inside face of the side wall 7a is made rough with many minute wrinkles made while the diameter is reduced without changing the thickness $t_1$ of the side wall. Accordingly, the inside face has a satisfactory rough surface thereacross on which extremely fine irregularities are formed at a uniform density, and as a result, a contact area with the cathode mix or the active material is enlarged. In contrast, for example, according to a conventional battery case provided with a flute or the like in the inside face of the side wall by applying the DI processing with a punch provided with a flute at the body portion, the contact area is not enlarged significantly. In addition, because the completed battery case 1 maintains the thin side wall 7a of the battery case element 7 intact, it maintains a large capacity.

According to the manufacturing method of the battery case 1, the inside face of the side wall 1a is made rough by undergoing a series of the manufacturing procedures of a battery. Hence, no special step is necessary to make the surface rough, whereby the battery case 1 is manufactured at high productivity.

Figure 1E:
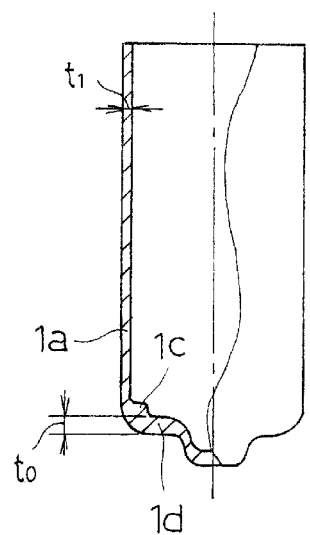
FIG. 1E is a partially broken side view showing another example of the battery case according to the embodiment.

The present invention can be applied to a battery case in which the positive electrode terminal is formed integrally with the bottom wall 1d as shown in FIG. 1E. This battery case is also manufactured such that the thickness $t_1$ of the side wall 1a with respect to the thickness $t_0$ of the bottom wall 1d satisfies $t_1 = \alpha t_0$ ($\alpha = 0.2$ to $0.7$), and that the average surface roughness of the inside face of the side wall 1a is 0.2 $\mu$m to 2.0 $\mu$m. The positive electrode terminal is formed by the drawing processing with a drawing die in a step prior to the ironing step.

Figure 4A:
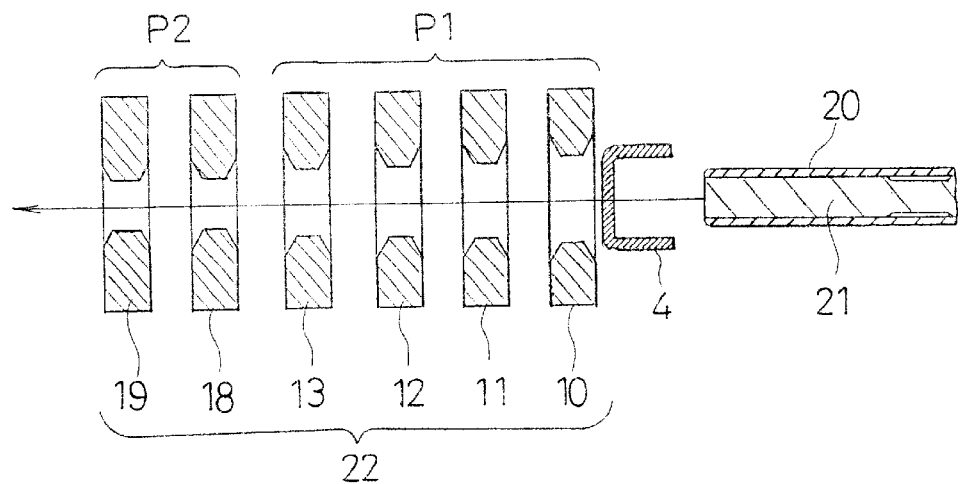
FIGS. 4A and 4B are cross sections schematically showing a sequence of manufacturing procedures to embody a method for manufacturing the above battery case according to a second embodiment of the invention.
Figure 4B:
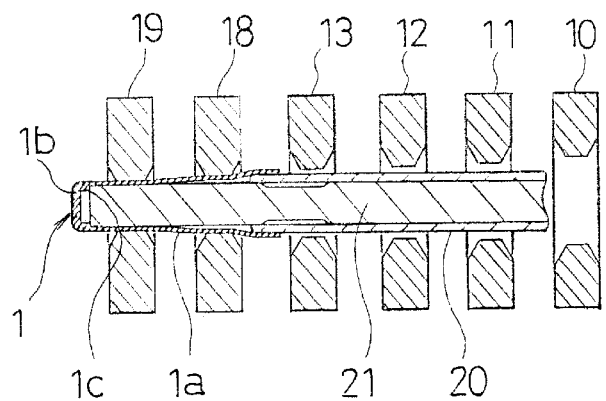

FIGS. 4A and 4B are cross sections schematically showing the manufacturing steps embodying a manufacturing method of the battery case 1 according to a second embodiment of the invention. In the drawings, like components are labeled with the same reference numerals with respect to FIGS. 2A through 3B, and the description of these components is omitted herein. The manufacturing method of the present embodiment is to manufacture the battery case 1 by applying the drawing processing and the ironing processing by the DI processing method in the first step and the drawing processing in the second step of the first embodiment to the cup-shaped intermediate product 4 at a time.

A press machine used in the manufacturing method of present embodiment includes a dies mechanism 22, and a hollow external punch 20 having the same outside shape as the first punch 8 used in the first step of the first embodiment, and an internal punch 21 having substantially the same shape as the second punch 14 used in the second step of the first embodiment and accommodated in the external punch 20 such that it is allowed to go therein and come out therefrom. The dies mechanism 22 includes the drawing die 10 and the first through third ironing dies 11 through 13 for a first step P1, and the first drawing die 18 and the second drawing die 19 for a second step P2, all of which are aligned in series concentrically with the axis of both the punches 20 and 21.

With the press machine, the external punch 20 accommodating the internal punch 21 moves ahead in a direction indicated by an arrow in the drawing while pushing the cup-shaped intermediate product 4, and passes through the drawing die 10 and the first through third ironing dies 11 through 13 sequentially, whereby a battery case element 7 is manufactured from the cup-shaped intermediate product 4 by the DI processing as the first step P1. As shown in FIG. 4B, the external punch 20 is stopped when its tip end portion has passed through the third ironing die 13 in the last stage of the first step P1, and only the internal punch 21 having projected from the external punch 20 continues to move ahead. The internal punch 21 moves ahead while pushing the battery case element 7 to move and passes through the first drawing die 18 and the second drawing die 19 sequentially, whereby the required battery case 1 is manufactured from the battery case element 7 by the drawing processing as the second step P2.

Hence, according to the manufacturing method of the second embodiment, the battery case 1 described in the first embodiment is manufactured from the cup-shaped intermediate product 4 by the first and second steps P1 and P2, which are substantially the same as the first and second steps in the first embodiment; moreover, the cup-shaped intermediate product 4 is plastically deformed into the battery case 1 by a series of steps at a time, which offers advantages that the productivity is enhanced drastically.

Figure 5A:
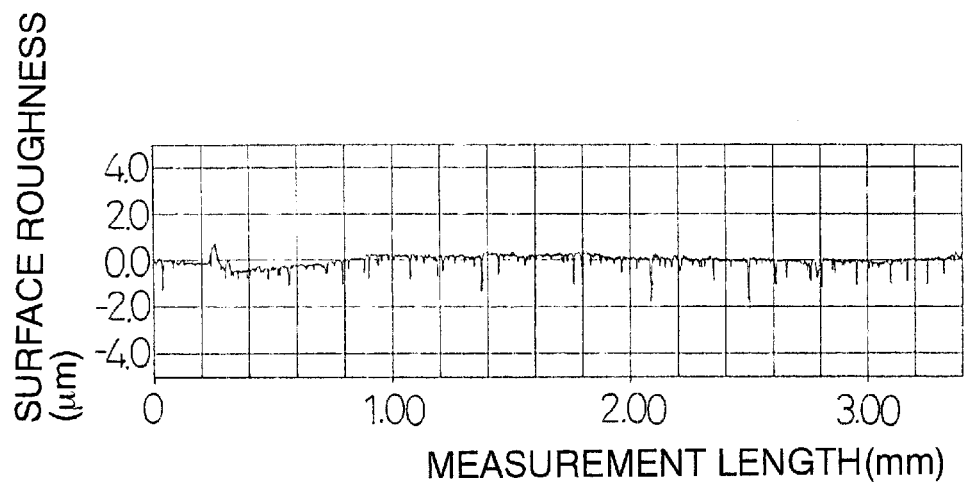
FIGS. 5A and 5B are graphs respectively showing actual measurement values of surface roughness of an inside face of a side wall of a battery case element manufactured in the first step of the above manufacturing method, and of an inside face of a side wall of a completed battery case measured along the circumferential direction.
Figure 5B:
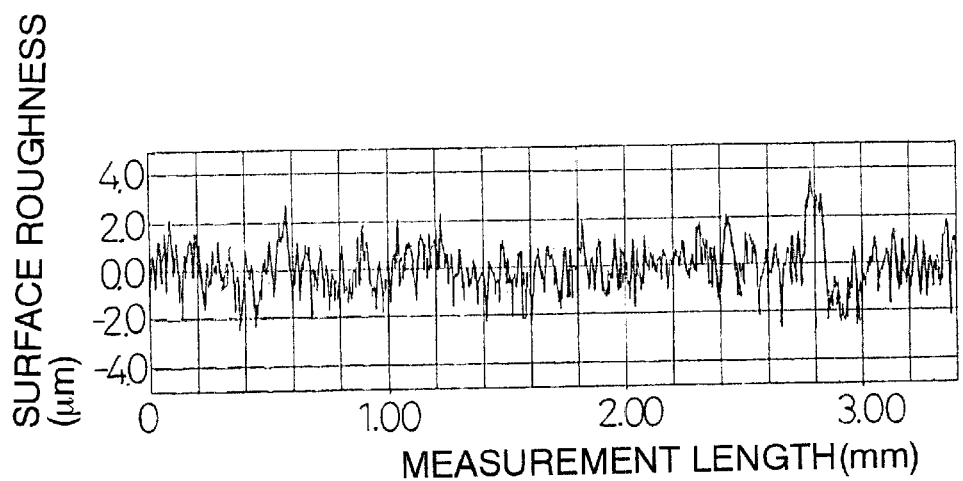
Figure 6A:
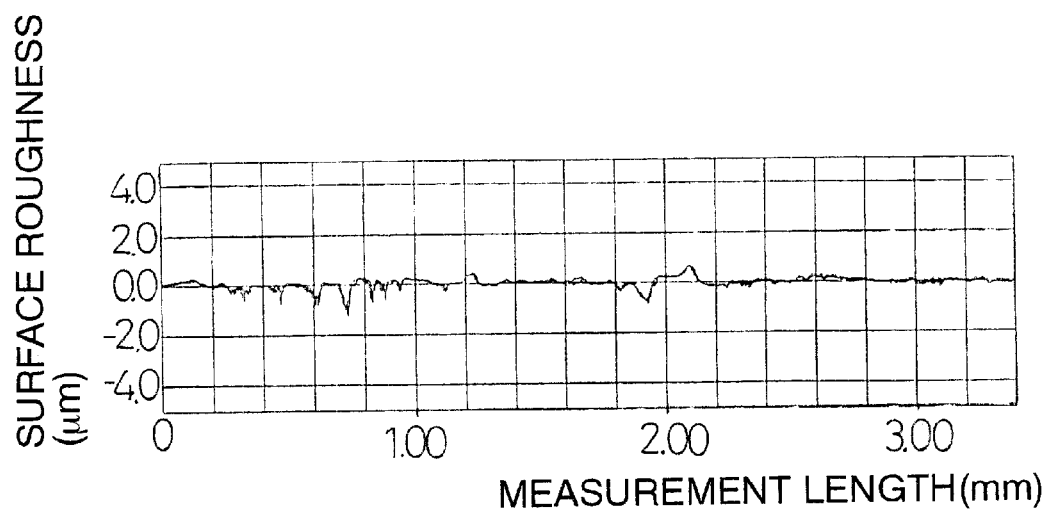
FIGS. 6A and 6B are graphs respectively showing actual measurement values of the surface roughness of the inside face of the side wall of the battery case element, and of the inside face of the side wall of the battery case measured along the axial direction.
Figure 6B:
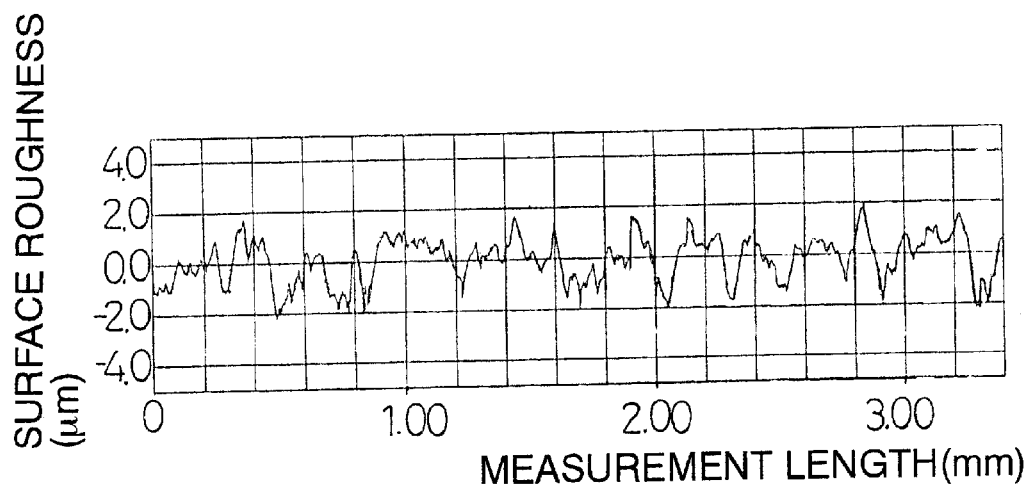

The inventors of the present invention actually manufactured the battery case 1 by the manufacturing method of the first embodiment, and measured an average surface roughness of the inside face of the side wall 1a of the battery case 1. FIGS. 5A and 5B are graphs respectively showing actual measurement values of the surface roughness of the side wall 7a of the battery case element 7 and of the side wall 1a of the battery case 1 measured along the circumferential direction (a direction intersecting with the axis at right angles). FIGS. 6A and 6B are graphs respectively showing actual measurement values of the surface roughness of the side wall 7a and of the side wall 1a measured along the axial direction.

The surface roughness was measured by a surface roughness and counter tester commercially known as "Surfcom 1400" of Tokyo Seimitsu Co., Ltd. In each graph, the horizontal axis represents a measurement length used as an evaluating length in finding average surface roughness Ra (JIS B 0601-1982), and the vertical axis represents the surface roughness. As is obvious from the surface roughness curves in FIGS. 5A and 5B and FIGS. 6A and 6B, the inner surface of the side wall 1a of the battery case 1 obtained by the manufacturing method of the invention is made rough significantly in comparison with the inner surface of the side wall 7a of the battery case element 7 manufactured by the DI processing method alone, that is, the inner surface of the side wall of the conventional battery case.

Figure 7:
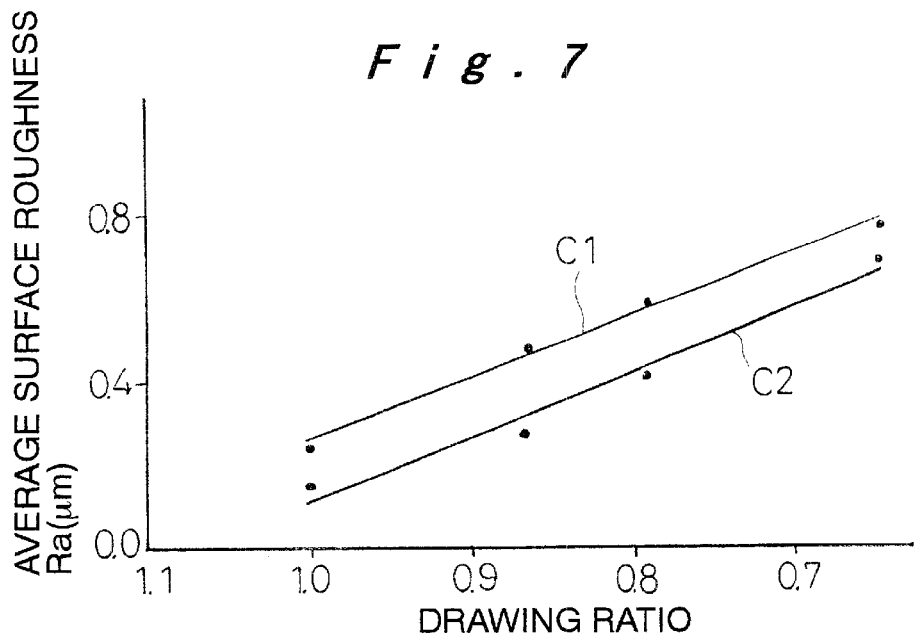
FIG. 7 is a characteristics view showing a relationship between a drawing ratio of the battery case to the battery case element and average surface roughness of the inside face of the side wall.

FIG. 7 is a characteristic view showing a relationship between a drawing ratio of the battery case 1 to the battery case element 7 calculated based on the surface roughness curve data in FIGS. 5A and 5B and FIGS. 6A and 6B and the average surface roughness Ra. The drawing ratio is a ratio (r/R) of the outside diameter r of the battery case 1 in the second step to the outside diameter R of the battery case element 7. Also, in FIG. 7, a curve C1 is a characteristic curve of the average surface roughness Ra in the circumferential direction of the battery case 1, and a curve C2 is a characteristic curve of the average surface roughness Ra in the axial direction of the battery case 1. As shown in the drawing, when the drawing ratio is changed to "1.00", "0.87", "0.79", and "0.65", the average surface roughness in the circumferential direction changes correspondingly to "0.24", "0.48", "0.58", and "0.76", respectively, and the average surface roughness in the axial direction changes correspondingly to "0.15", "0.28", "0.41", and "0.68", respectively.

Incidentally, a parameter used as an index in enlarging the contact area between the side wall 1a with the cathode mix or the active material accommodated in the battery case 1 is the average surface roughness Ra in the circumferential direction of the battery case 1. In order to enlarge the contact area, it is preferable to set the average surface roughness Ra to a range from 0.2 $\mu$m to 2.0 $\mu$m. To this end, the drawing ratio in the second step is set to a range from 0.4 to 0.9, and more preferably, to a range from 0.5 to 0.8. When the drawing ratio is set to 0.4 or lower, it becomes difficult to manufacture a less-deformed battery case 1 from the battery case element 7 in the second step. When the drawing ratio is set to 0.9 or higher, the side wall 1a of the battery case 1 is not made rough in a satisfactory manner. Hence, the advantages of enlarging the contact area become less satisfactory.

Further, in order to obtain the battery case 1 having a less-deformed shape by setting the drawing ratio (r/R) in the second step to the above-specified range, it is preferable to manufacture the battery case element 7 having a ratio ($t_1/t_2$) of the thickness $t_1$ of the side wall 7a and the thickness $t_2$ of the bottom wall 7b in a range from 0.2 to 0.7 in the first step.

Figure 8:
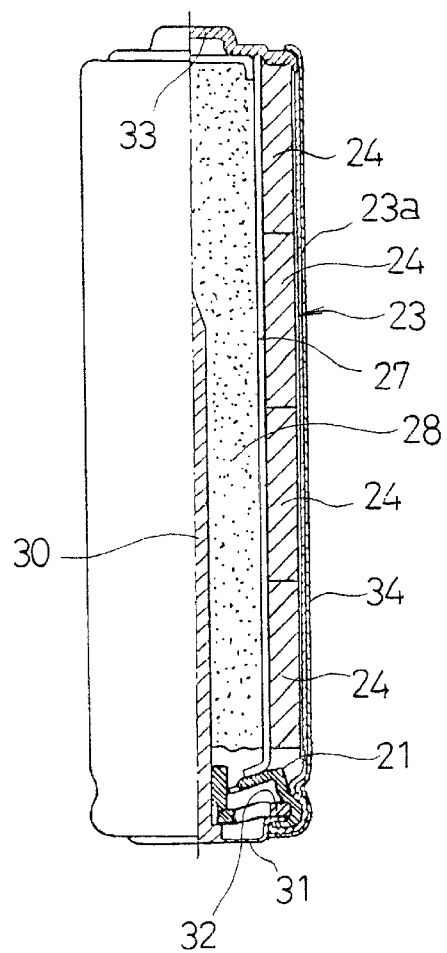
FIG. 8 is a partially cutaway cross section showing a size AA alkaline dry battery.

FIG. 8 is a partially cutaway cross section showing a size AA alkaline dry battery, and a battery case 23 of this battery is manufactured by the manufacturing method of the above embodiments. A cathode mix 24, which is molded into a plurality of pellets by kneading manganese dioxide serving as the positive electrode active material, graphite serving as a conductive agent, and potassium hydroxide serving as an electrolyte, is inserted under a pressure the battery case 23 also serving as the positive electrode. A separator 27 is inserted into an inner hallow portion of the cathode mix 24, and a negative electrode gel material 28 made of an aqueous solution of caustic potash serving as an electrolyte, a viscous material, and a zinc powder is filled inside the separator 27.

An assembly, including a negative electrode collector 30 formed integrally with a negative electrode bottom plate 31 being press-fit into a sealing body 29 provided with an explosion proof mechanism at the center thereof through a washer 32, is inserted into the opening portion of the battery case 23, and the opening portion is sealed by being adhered firmly to an engaging portion of the sealing body 29. A positive electrode terminal 33 is formed integrally at the bottom portion of the battery case 23 also serving as the positive electrode. Also, the battery case 23 is wrapped with an exterior label 34 laminated onto the outside face thereof.

With this alkaline dry battery, the cathode mix 24 and the battery case 23 establish electrical conduction only by a secondary contact therebetween. The battery case 23 is manufactured by the manufacturing method of the first or second embodiment, and has a rough surface having many fine irregularities as shown in FIG. 1C on the inside face of the side wall 23a. For this reason, the alkaline dry battery has a drastically enlarged contact area between the cathode mix 24 and the inside face of the side wall 23a of the battery case 23 in comparison with the conventional battery case, which reduces an internal resistance of the battery, thereby exhibiting an extremely superior battery performance. Also, when the inside face of the battery case 23 is coated with a conductive agent, such as carbon, the retentivity for the conductive agent is enhanced by the inside face made rough. Consequently, not only an internal resistance of the battery is reduced further, but also the post-preservation battery characteristics are enhanced.

The battery case 23, having undergone the step of manufacturing the battery case element 7 from the cup-shaped intermediate product 4 by the DI processing method in the first step, has a large capacity, because the side wall 23a is stretched and the thickness thereof is reduced in comparison with the bottom wall, so that the diameter is reduced without changing the thickness of the side wall 23a in the second step. Consequently, the battery case 23 can be filled with a greater quantity of the cathode mix 24 or the negative electrode gel material 28, which enhances the battery performance, such as the charge and discharge characteristics. Moreover, because the diameter of the battery case 23 is reduced in the second step without changing the thickness of the side wall of the battery case element, a material corresponding to deformation caused by the diameter reduction is flown so that it is released into the bottom wall, and a step portion is formed at the peripheral portion of the bottom wall thicker than the side wall. Consequently, the battery case 23 has a larger capacity by reducing the thickness of the side wall 23a on one hand, and on the other hand, it achieves better strength due to the thick bottom wall and the step portion, thereby preventing an occurrence of buckling or the like.

Figure 9:
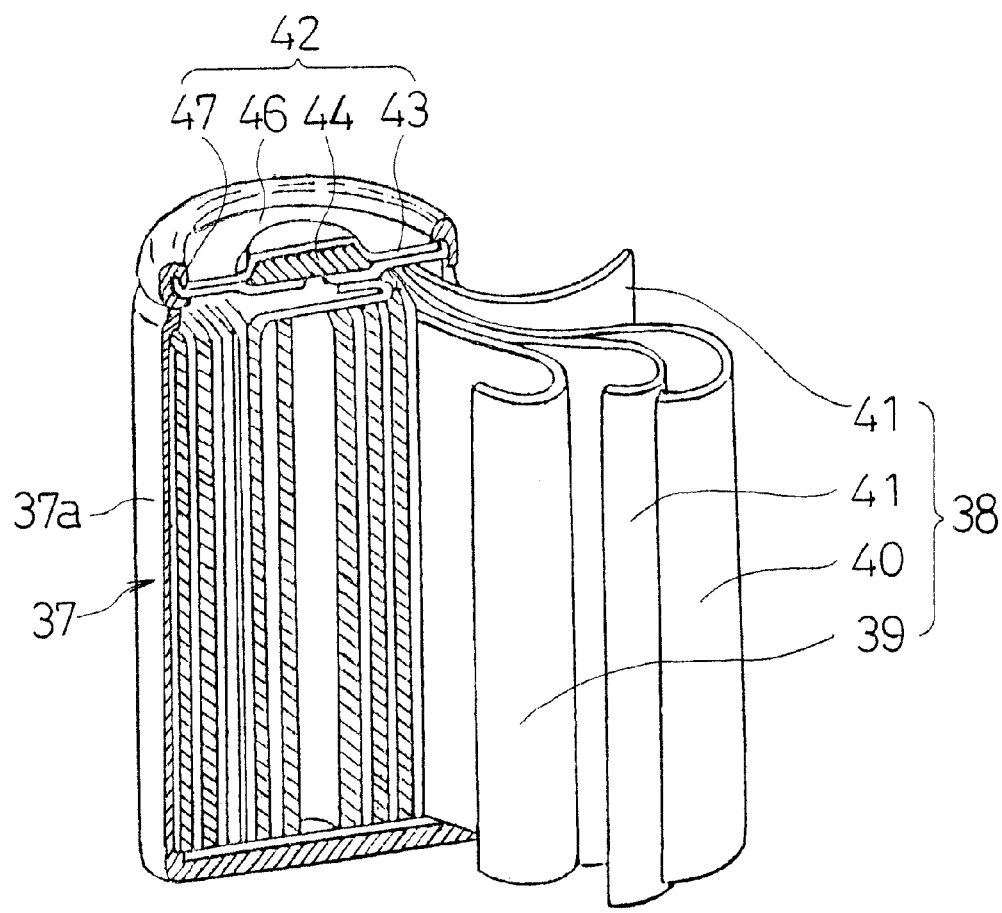
FIG. 9 is a partially broken perspective view showing a nickel-cadmium rechargeable battery.

FIG. 9 is a partially broken perspective view showing a nickel-cadmium rechargeable battery, and a battery case 37 of this battery is also manufactured by the manufacturing methods described above. An electrode group 38 accommodated in the battery case 37 includes a positive electrode plate 39 composed of a core coated with a positive electrode active material having nickel hydroxide as a principal component, and a negative electrode plate 40 composed of a core coated with a negative electrode active material having a hydrogen-absorption alloy powder as a principal component, which are deposited with a separator 41 being disposed in between and convoluted. After the electrode group 38 is accommodated into the battery case 37, an electrolyte (not shown) is filled therein, and an opening portion of the case is sealed airtight by a sealing member 42 including a sealing plate 43, a safety vent 44, an insulation gasket 47, and a metal cap 46.

With the nickel-cadmium rechargeable battery, a positive electrode lead is extended from the positive electrode plate 39 of the convoluted electrode group 38 and connected to the sealing plate 43, and a negative electrode lead is extended from the negative electrode plate 40 and connected to the bottom portion of the battery case 37.

In the nickel-cadmium rechargeable battery arranged in this manner, the negative electrode lead of the negative electrode plate 40 is connected to the battery case 37 also serving as the negative electrode, and therefore, electrical conduction by a contact between the inside face of the side wall 37a of the battery case 37 and the negative electrode plate 40 is not necessary. The electrode group 38 is fixed inside the battery case 37 by contacting the rough inside face of the side wall 37a of the battery case 37 with a large contact area. As a result, when an external impact or a drop impact is applied, an occurrence of a shift between the electrode group 38 and the inside face of the battery case 37 is restrained, thereby preventing an internal short-circuit. Likewise the alkaline dry battery described above, this battery has a larger capacity by reducing the thickness of the side wall 37a on one hand, and on the other hand, it achieves better strength because of the thick bottom wall and the step portion at the peripheral portion between the bottom wall and the side wall, thereby preventing an occurrence of buckling or the like.

Also, there is a nickel-cadmium rechargeable battery of a type arranged such that the negative electrode plate 40 positioned at the outermost radius of the electrode group 38 has a plane-contact with the inside face of the battery case 37 also serving as the negative electrode in establishing electrical conduction. In other words, in the battery arranged in this manner, a lead portion of the negative electrode plate 40 is not spot-welded to the bottom portion of the battery case 37. Thus, the negative electrode plate 40 at the outermost radius and the inside face of the battery case 37 need to contact with each other at a large contact area. However, because the battery case 37 is manufactured by the first or second manufacturing method described as above, it has a rough surface having many fine irregularities on the inside face of the side wall 37a, which drastically enlarges the contact area between the negative electrode plate 40 at the outermost radius and the inside face of the side wall 37a in comparison with a conventional battery case. As a result, an internal resistance of the battery is reduced and superior charge and discharge characteristics are achieved.

Figure 10:
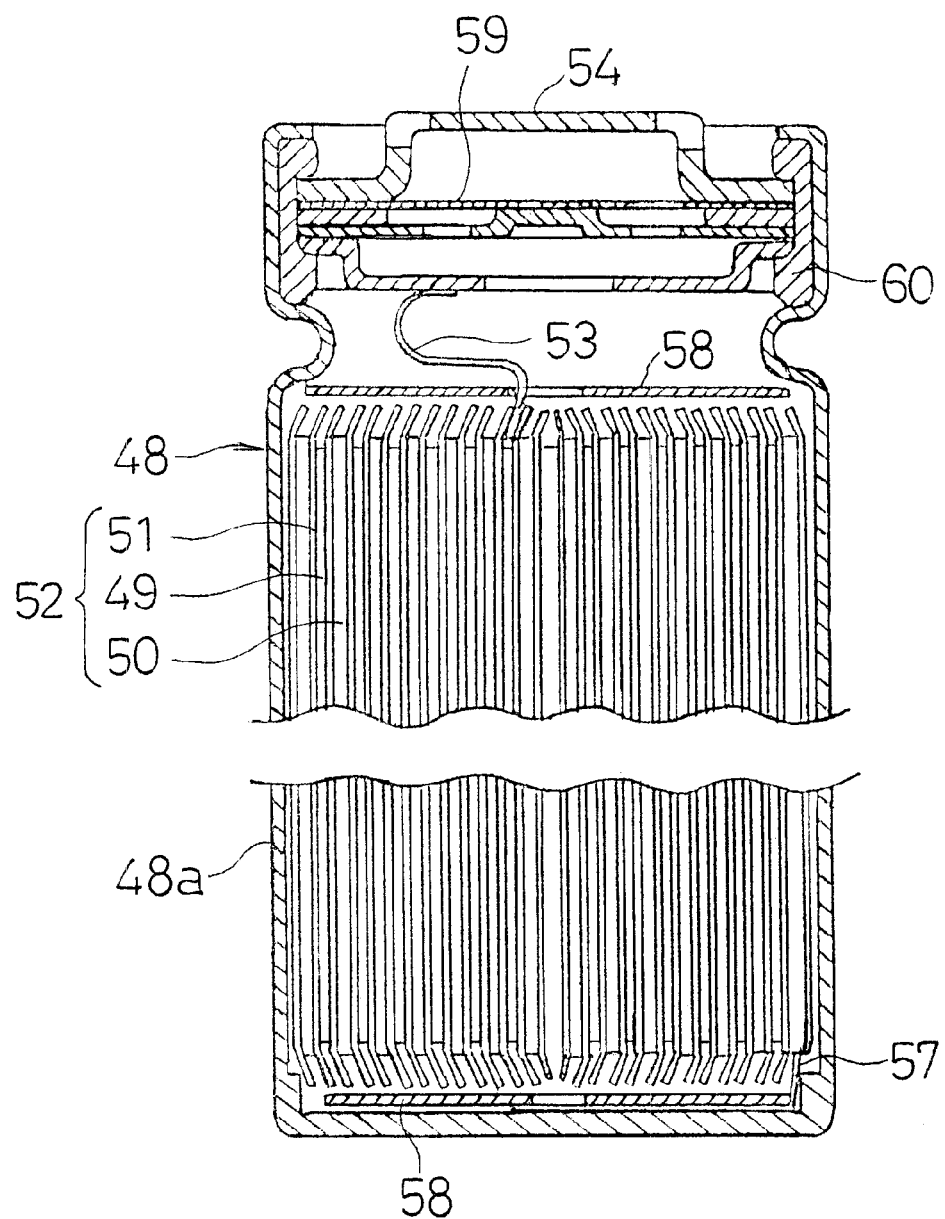
FIG. 10 is a longitudinal cross section showing a cylindrical lithium rechargeable battery.

FIG. 10 is a longitudinal cross section showing a cylindrical lithium rechargeable battery, and a battery case 48 of this battery is also manufactured by the manufacturing method of the above embodiments. An electrode group 52, which is composed of a positive electrode plate 49 and a negative electrode plate 50 deposited with a separator 51 being disposed in between and convoluted, is accommodated in the battery case 48. A positive electrode lead 53 is extended from the positive electrode plate 49 and connected to a sealing plate 54, and a negative electrode lead 57 is extended from the negative electrode plate 50 and connected to the bottom portion of the battery case 48. Insulation rings 58 are provided at the top and bottom portions of the electrode group 52, respectively. After the battery case 48 is filled with an electrolyte (not shown), the opening portion thereof is sealed with the sealing plate 54 provided with a safety vent 59 and an insulation packing 60.

In this lithium rechargeable battery, because the negative lead 57 of the negative electrode plate 50 is connected to the battery case 48 also serving as the negative electrode, electrical conduction by a contact between the inside face of the side wall 48a of the battery case 48 and the negative electrode plate 50 is not necessary. The electrode group 52 is fixed inside the battery case 48 by contacting the rough inside face of the side wall 48a of the battery case 48 at a large contact area. Hence, when an external impact is applied, the electrode group 52 is prevented from moving inside the battery case 48, which offers advantages that a change in an internal resistance of the battery is restrained.

INDUSTRIAL APPLICABILITY

As has been discussed, according to the battery case of the present invention, the inside face of the side wall is formed to have an adequate rough surface. Hence, a contact area between the inside face of the side wall with the cathode mix or the active material accommodated therein is enlarged and an internal resistance of the battery is reduced. Moreover, when an conductive material, such as carbon, is applied onto the inside face of the side wall, the retentivity for the conductive material is enhanced, which makes it possible to maintain high post-preservation battery characteristics over a long period. Further, the side wall is made thinner than the bottom wall by undergoing the ironing processing. Hence, it is possible to enhance the battery performance, such as charge and discharge characteristics, by increasing a filling quantity of the cathode mix or the active material.

Also, according to the manufacturing method of the battery case of the invention, the battery case element manufactured in the first step is plastically deformed to a condition that the outside diameter is reduced to a predetermined smaller outside diameter while maintaining the thickness of the side wall intact in the second step where no ironing processing is applied. Hence, the inside face of the side wall of the battery case is made rough as many minute wrinkles are made, and fine irregularities are formed across the inside face at a uniform density, whereby a contact area with the cathode mix and the active material is enlarged. Also, because the side wall becomes thinner than the bottom wall, it is possible to manufacture a battery case having a large capacity. Furthermore, because a material corresponding to deformation caused by the diameter reduction of the battery case element is flown so that it is released into the bottom wall, the thickness of the bottom wall increases slightly in comparison with the battery case element, and a step portion is formed at the peripheral portion of the bottom wall. Thereby, it is possible to obtain a battery case having the strength high enough to prevent an occurrence of buckling or the like. Consequently, the present invention is useful in achieving a better battery performance and higher strength of the battery case at the same time.

What is claimed is:

1. A manufacturing method of a battery case, comprising:

a first step of manufacturing a battery case element (7) by applying drawing processing and ironing processing by pushing a cup-shaped intermediate product (4) by an external punch (20) to pass through a drawing die (10) and ironing dies (11, 12, and 13) aligned in multiple stages, all of which are aligned in series, so that a thickness ($t_1$) of a side wall (7a) with respect to a thickness ($t_0$) of a bottom wall (7b) satisfies $t_1=\alpha t_0$ ($\alpha=0.2$ to $0.7$);

stopping said external punch when a tip end portion thereof has passed through the ironing die (13) at a last stage in said first step, whereupon an internal punch (21), which is allowed to go into and come out from said external punch, projects from said external punch and continues to move ahead; and a second step of manufacturing a battery case (1) by reducing an outside diameter to a predetermined diameter without changing the thickness of the side wall, by applying drawing processing by pushing said battery case element by said internal punch to pass through a plurality of drawing dies (18 and 19) aligned in series contiguously to a latter stage side of said dies in said first step.

2. The manufacturing method of a battery case according to claim 1, wherein, in the second step, the drawing processing is applied in such a manner that a drawing ratio r/R of an outside diameter (r) of said battery case (1) to an outside diameter (R) of said battery case element (7) is 0.4 to 0.9.

* * * * *